(12) United States Patent
Hattori et al.

(10) Patent No.: US 11,223,254 B2
(45) Date of Patent: Jan. 11, 2022

(54) CAPACITOR UNIT, AND ELECTRIC COMPRESSOR

(71) Applicant: MITSUBISHI HEAVY INDUSTRIES THERMAL SYSTEMS, LTD., Tokyo (JP)

(72) Inventors: Makoto Hattori, Tokyo (JP); Hiroyuki Kamitani, Tokyo (JP); Hiroto Higuchi, Tokyo (JP); Takayuki Takashige, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 329 days.

(21) Appl. No.: 16/348,393

(22) PCT Filed: Nov. 2, 2017

(86) PCT No.: PCT/JP2017/039674
§ 371 (c)(1),
(2) Date: May 8, 2019

(87) PCT Pub. No.: WO2018/088317
PCT Pub. Date: May 17, 2018

(65) Prior Publication Data
US 2019/0267190 A1 Aug. 29, 2019

(30) Foreign Application Priority Data
Nov. 11, 2016 (JP) .............................. JP2016-220656

(51) Int. Cl.
*H02K 5/22* (2006.01)
*H02K 11/33* (2016.01)
(Continued)

(52) U.S. Cl.
CPC ............... *H02K 5/225* (2013.01); *H02K 5/24* (2013.01); *H02K 7/14* (2013.01); *H02K 11/0094* (2013.01);
(Continued)

(58) Field of Classification Search
CPC .......... H02M 7/00; H02M 7/003; H02K 5/24; H02K 13/00; H02K 11/33; H02K 11/30;
(Continued)

(56) References Cited

U.S. PATENT DOCUMENTS 6,206,718 B1 3/2001 Takahashi et al.
2003/0132040 A1 7/2003 Radosevich et al.
(Continued)

FOREIGN PATENT DOCUMENTS

CN 105322722 A 2/2016
EP 2816716 A1 12/2014
(Continued)

OTHER PUBLICATIONS

Machi Tatsuya, Substrate Connecting Member, Nov. 16, 2001, Denso Corp, JP 2001319701 (English Machine Translation) (Year: 2001).*
(Continued)

*Primary Examiner* — Quyen P Leung
*Assistant Examiner* — Alexander A Singh
(74) *Attorney, Agent, or Firm* — Birch, Stewart, Kolasch & Birch, LLP.

(57) ABSTRACT

A capacitor unit (20) includes: a harness side terminal (23) provided on a first end portion (22a) side of a first surface of a housing (22) for accommodating a capacitor main body therein; a board side terminal (24) provided in the housing (22) and connectable to a circuit board; and a plurality of guide portions (25) that protrude from the first surface and extend from a second end portion (22b) on a side opposite
(Continued)

to the first end portion (22*a*) toward the first end portion (22*a*). The plurality of guide portions (25) are provided to be separated in a second direction orthogonal to a first direction of connecting the first end portion (22*a*) and the second end portion (22*b*) to each other so as to sandwich the harness side terminal (23) therebetween.

8 Claims, 6 Drawing Sheets

(51) Int. Cl.
    *H02K 7/14*     (2006.01)
    *H02K 11/00*     (2016.01)
    *H02K 5/24*     (2006.01)
    *F04C 18/02*     (2006.01)
    *F04C 29/00*     (2006.01)
    *H01G 4/224*     (2006.01)
    *H01G 4/236*     (2006.01)
    *H01R 4/30*     (2006.01)
    *H01R 11/12*     (2006.01)
    *H02M 7/48*     (2007.01)
    *H02M 7/00*     (2006.01)
    *H01R 13/405*     (2006.01)
    *H01R 4/34*     (2006.01)
    *H01R 12/51*     (2011.01)

(52) U.S. Cl.
    CPC .......... *H02K 11/33* (2016.01); *F04C 18/0215* (2013.01); *F04C 29/0085* (2013.01); *H01G 4/224* (2013.01); *H01G 4/236* (2013.01); *H01R 4/30* (2013.01); *H01R 4/34* (2013.01); *H01R 11/12* (2013.01); *H01R 12/515* (2013.01); *H01R 13/405* (2013.01); *H02K 2211/03* (2013.01); *H02M 7/003* (2013.01); *H02M 7/48* (2013.01)

(58) Field of Classification Search
    CPC ............ H02K 3/50; H02K 5/225; H02K 7/14; H02K 11/35; H02K 11/38; H02K 11/40; H02K 2211/03; H02K 11/0094; H02K 5/22; H01G 4/224; H01G 4/236; F04B 35/04; F25B 1/005; H01R 4/30
    USPC .................... 310/71, 68 R, 68 B, 68 C, 68 D
    See application file for complete search history.

(56) References Cited

U.S. PATENT DOCUMENTS

| 2004/0092134 | A1* | 5/2004 | Morikaku | H02K 5/225 |
| | | | | 439/13 |
| 2005/0227547 | A1* | 10/2005 | Hunziker | H01R 13/743 |
| | | | | 439/709 |
| 2006/0239050 | A1 | 10/2006 | Andersson et al. | |
| 2007/0109715 | A1* | 5/2007 | Azuma | B60K 6/28 |
| | | | | 361/299.3 |
| 2011/0228508 | A1* | 9/2011 | Inuduka | H02M 7/003 |
| | | | | 361/811 |
| 2011/0316373 | A1* | 12/2011 | Kobayashi | H02K 11/33 |
| | | | | 310/71 |
| 2016/0036289 | A1 | 2/2016 | Kawata et al. | |
| 2016/0135320 | A1* | 5/2016 | Yakushiji | H05K 7/1417 |
| | | | | 417/410.5 |

FOREIGN PATENT DOCUMENTS

| JP | 6-245542 A | | 9/1994 |
| JP | 2001319701 A | * | 11/2001 |
| JP | 2006-512036 A | | 4/2006 |
| JP | 2007-336761 A | | 12/2007 |
| JP | 2010-7974 A | | 1/2010 |
| JP | 2013-163503 A | | 8/2013 |

OTHER PUBLICATIONS

International Search Report for International Application No. PCT/JP2017/039674, dated Nov. 28, 2017, with English translation.
Written Opinion of the International Searching Authority for International Application No. PCT/JP2017/039674, dated Nov. 28, 2017, with English translation.

* cited by examiner

CAPACITOR UNIT, AND ELECTRIC COMPRESSOR

TECHNICAL FIELD

The present invention relates to a capacitor unit and an electric compressor.

Priority is claimed on Japanese Patent Application No. 2016-220656, filed on Nov. 11, 2016, the content of which is incorporated herein by reference.

BACKGROUND ART

For example, in a vehicle-mounted air conditioner, high space saving properties are required because of the need to accommodate various components in a limited space in a vehicle. Therefore, in recent years, in order to improve the space saving properties, there is provided an electric compressor integrally including a compressor that configures the vehicle-mounted air conditioner, a motor that drives the compressor, and a control device that controls the motor.

A control device of such an electric compressor includes a capacitor unit and a circuit board. The circuit board converts DC power smoothed via the capacitor unit into three-phase AC power. As the three-phase AC power output from the circuit board is supplied to a stator of the motor, a rotor of the motor rotates and drives a compressor.

The capacitor unit is connected to a power source, such as a battery or a generator, via a power source harness. Therefore, the capacitor unit includes a harness side terminal to which the power source harness is connected. In addition, the capacitor unit includes a board side terminal connected to a wiring pattern formed on the circuit board. For example, PTL 1 describes a configuration including a bus bar that forms a harness side terminal and a board side terminal in a capacitor module.

CITATION LIST

Patent Literature

[PTL 1] Japanese Unexamined Patent Application, First Publication No. 2007-336761

SUMMARY OF INVENTION

Technical Problem

Incidentally, in the power source harness, a connection terminal provided in the distal end portion is bolted to a harness side terminal provided in the capacitor unit. Therefore, in the power source harness, in the vicinity of the capacitor unit, only the connection terminal of the distal end portion is fixed, and a wiring connected to the connection terminal is not fixed. Therefore, the wiring vibrates due to the vibration generated when the vehicle travels. As a result, stress is repeatedly applied to the connection part between the connection terminal fixed to the harness side terminal and the wiring connected to the connection terminal. There is a possibility that a load is generated to the connection part between the wiring of the power source harness and the connection terminal as the repeated stress is generated. Therefore, it is desirable to suppress the vibration of the power source harness connected to the capacitor unit.

The present invention provides a capacitor unit and an electric compressor that are capable of suppressing vibration of a power source harness to be connected to a capacitor unit.

Solution to Problem

According to a first aspect of the present invention, there is provided a capacitor unit including: a housing that accommodates a capacitor main body therein; a harness side terminal provided on a first end portion side of a first surface of the housing and connectable to a power source harness for supplying DC power from an outside; a board side terminal provided in the housing and connectable to a circuit board from which the DC power is output via the capacitor main body; and a plurality of guide portions that protrude from the first surface and extend from a second end portion on a side opposite to the first end portion on the first surface toward the first end portion, in which the plurality of guide portions are provided to be separated in a second direction orthogonal to a first direction of connecting the first end portion and the second end portion to each other so as to sandwich the harness side terminal therebetween.

With the configuration, when being fixed to the harness side terminal, the power source harness is disposed to extend from the first end portion toward the second end portion in a state where the first surface is sandwiched from the second direction by the guide portions. Therefore, the guide portion restricts the movement of the power source harness in the second direction. Accordingly, it is possible to suppress excessive vibration of the power source harness.

In addition, according to a second aspect of the present invention, in the capacitor unit of the first aspect, the plurality of guide portions may be provided in a pair so as to sandwich therebetween one of the harness side terminals in the second direction.

With the configuration, the guide portions are disposed on both sides of one power source harness fixed to the harness side terminal. Accordingly, it is possible to ensure an insulation distance around the power source harness.

In addition, according to a third aspect of the present invention, the capacitor unit of the first aspect or the second aspect may further include a harness abutting portion that protrudes on the second end portion side of the first surface and that is configured to abut against the power source harness in the second direction.

With the configuration, the power source harness comes into contact with the harness abutting portion from the second direction on the second end portion side. Therefore, movement of the power source harness in the second direction is restricted not only on the first end portion side fixed to the harness side terminal but also on the second end portion side. Accordingly, it is possible to effectively suppress vibration of the power source harness in the second direction.

In addition, according to a fourth aspect of the present invention, in the capacitor unit of any one of the first aspect to the third aspect, the board side terminal may be provided in the first end portion of the housing.

With the configuration, the harness side terminal and the board side terminal are disposed on the same side of the housing (the first end portion side). Therefore, the connection work between the board side terminal and the board and the connection work between the harness side terminal and the power source harness can be efficiently performed.

In addition, according to a fifth aspect of the present invention, in the capacitor unit of any one of the first aspect to the fourth aspect, the board side terminal may extend in a plate shape from a base portion held in the housing toward a distal end portion connected to the circuit board, and have a notch recessed inward of the board side terminal in a width direction between the base portion and the distal end portion.

With the configuration, a region having a sectional area smaller than the distal end portion or the base portion is partially formed in the board side terminal by the notch portion. Therefore, the vibration of the distal end portion in the second direction with respect to the base portion is absorbed by the region in which the notch portion is formed. As a result, it is possible to suppress stress concentration in the distal end portion connected to the circuit board. Therefore, the vibration transmitted from the circuit board to the board side terminal can be absorbed, and the deformation or damage to the connection part between the board side terminal and the distal end portion can be suppressed.

In addition, according to a sixth aspect of the present invention, in the capacitor unit of the fifth aspect, a first notch portion formed on a first side of the board side terminal in the width direction and a second notch portion formed on a second side of the board side terminal in the width direction, may be formed.

With the configuration, the vibration of the distal end portion with respect to any direction of the board side terminal in the width direction is absorbed by the region in which the first notch portion and the second notch portion are formed. As a result, it is possible to further suppress stress concentration in the distal end portion connected to the circuit board by a solder. Therefore, the vibration transmitted from the circuit board to the board side terminal can be absorbed, and the deformation or damage to the board side terminal can be more effectively suppressed.

In addition, according to a seventh aspect of the present invention, in the capacitor unit of the sixth aspect, the first notch portion and the second notch portion may be formed at an interval in a direction of connecting the base portion and the distal end portion to each other.

With the configuration, it is possible to form an S-shaped curved region between the distal end portion and the base portion for the board side terminal. Such a shape can be formed at the same time with a thin board side terminal by cutting a plate made of a conductive metal into a predetermined shape by pressing or the like. Therefore, it is not necessary to increase the number of processing steps in order to form a curved region, and it is possible to form the first notch portion and the second notch portion which are efficiently recessed in different directions.

In addition, according to an eighth aspect of the present invention, there is provided an electric compressor including: the capacitor unit according to any one of the first aspect to the seventh aspect; a power source harness of which one end portion is connected to the harness side terminal and which extends toward the second end portion side; the circuit board that is configured to convert the DC power output from the capacitor unit into AC power; a motor rotationally driven by the AC power output from the circuit board; a compression mechanism driven by the motor; and a casing that accommodates the capacitor unit, the circuit board, the motor, and the compression mechanism.

In addition, according to a ninth aspect of the present invention, in the electric compressor of the eighth aspect, the casing may include a casing side harness abutting portion which abuts against the power source harness derived from the second end portion side of the housing.

With the configuration, the power source harness is also supported at a part derived from the capacitor unit. Accordingly, it is possible to further suppress the vibration of the power source harness.

Advantageous Effects of Invention

According to the present invention, it becomes possible to suppress the vibration of the power source harness to be connected to the capacitor unit.

DESCRIPTION OF EMBODIMENTS

Hereinafter, with reference to attached drawings, embodiments for realizing a capacitor unit and an electric compressor according to the present invention will be described. However, the present invention is not limited to the embodiments.

Figure 1:
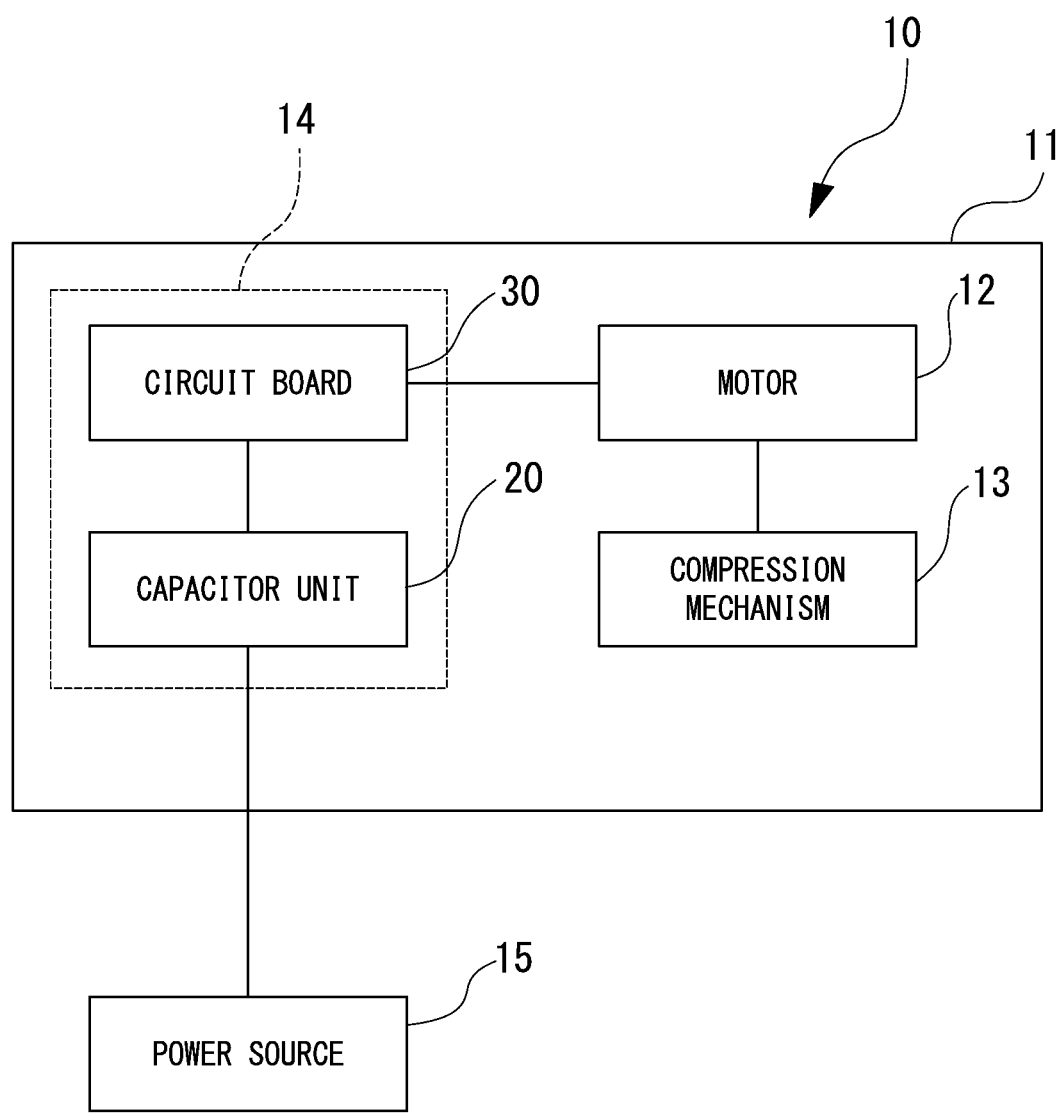
FIG. 1 is a schematic view showing a configuration of an electric compressor according to an embodiment of the present invention.
Figure 2:
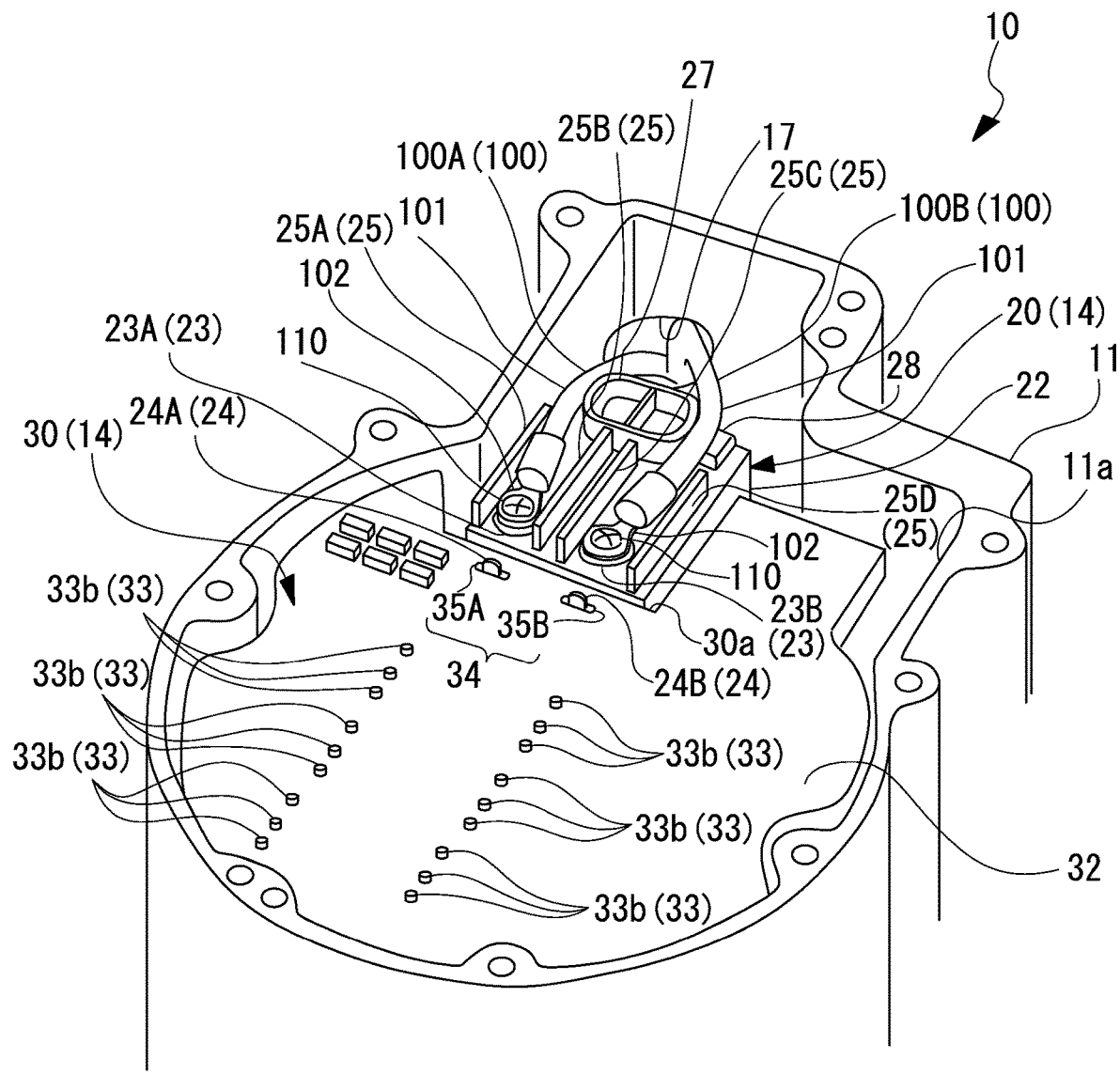
FIG. 2 is a perspective view showing a circuit board and a capacitor unit provided in the electric compressor.
Figure 3:
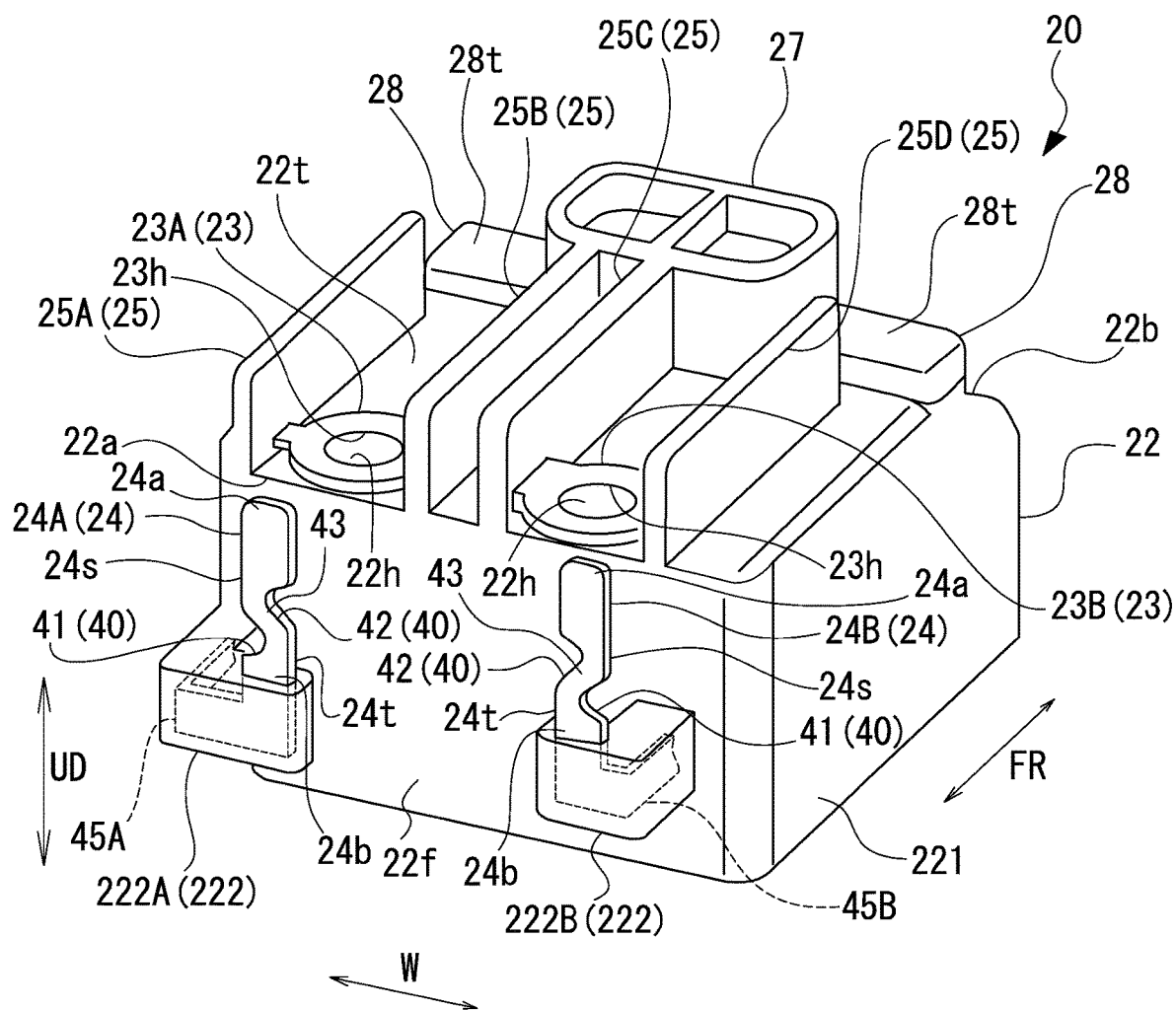
FIG. 3 is a perspective view showing the capacitor unit.
Figure 4:
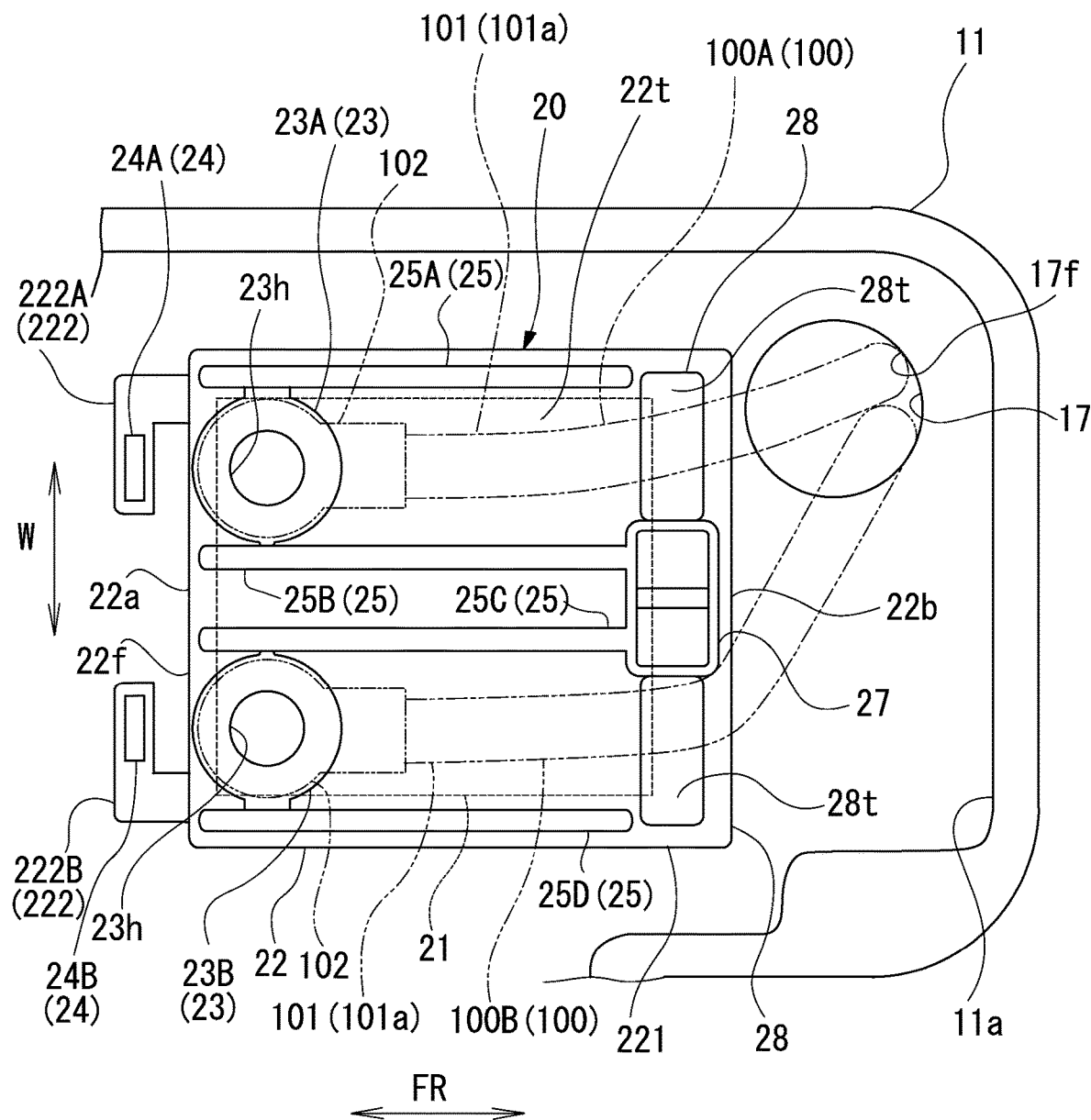
FIG. 4 is a plan view showing the capacitor unit provided in a casing of the electric compressor.
Figure 5:
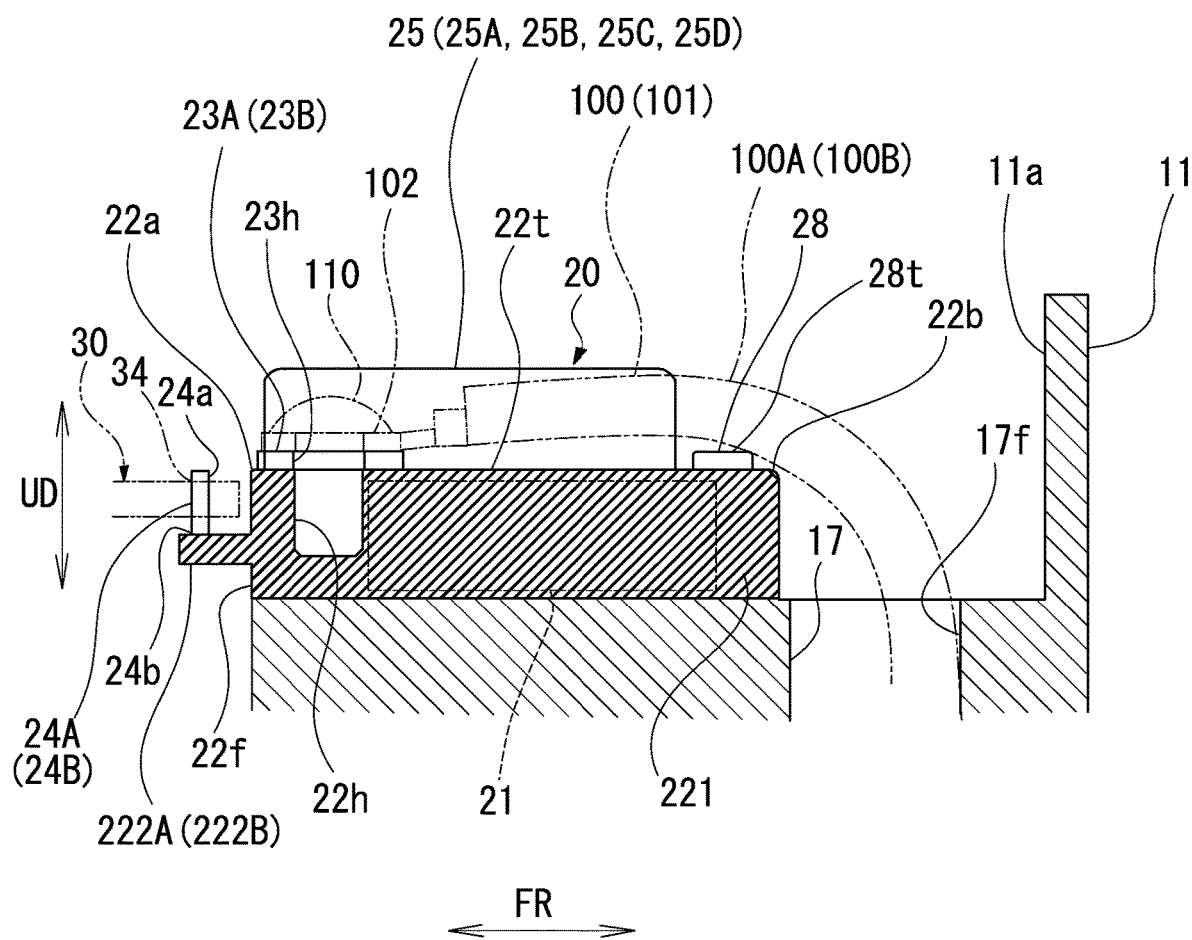
FIG. 5 is a side sectional view showing the capacitor unit provided in the casing.
Figure 6:
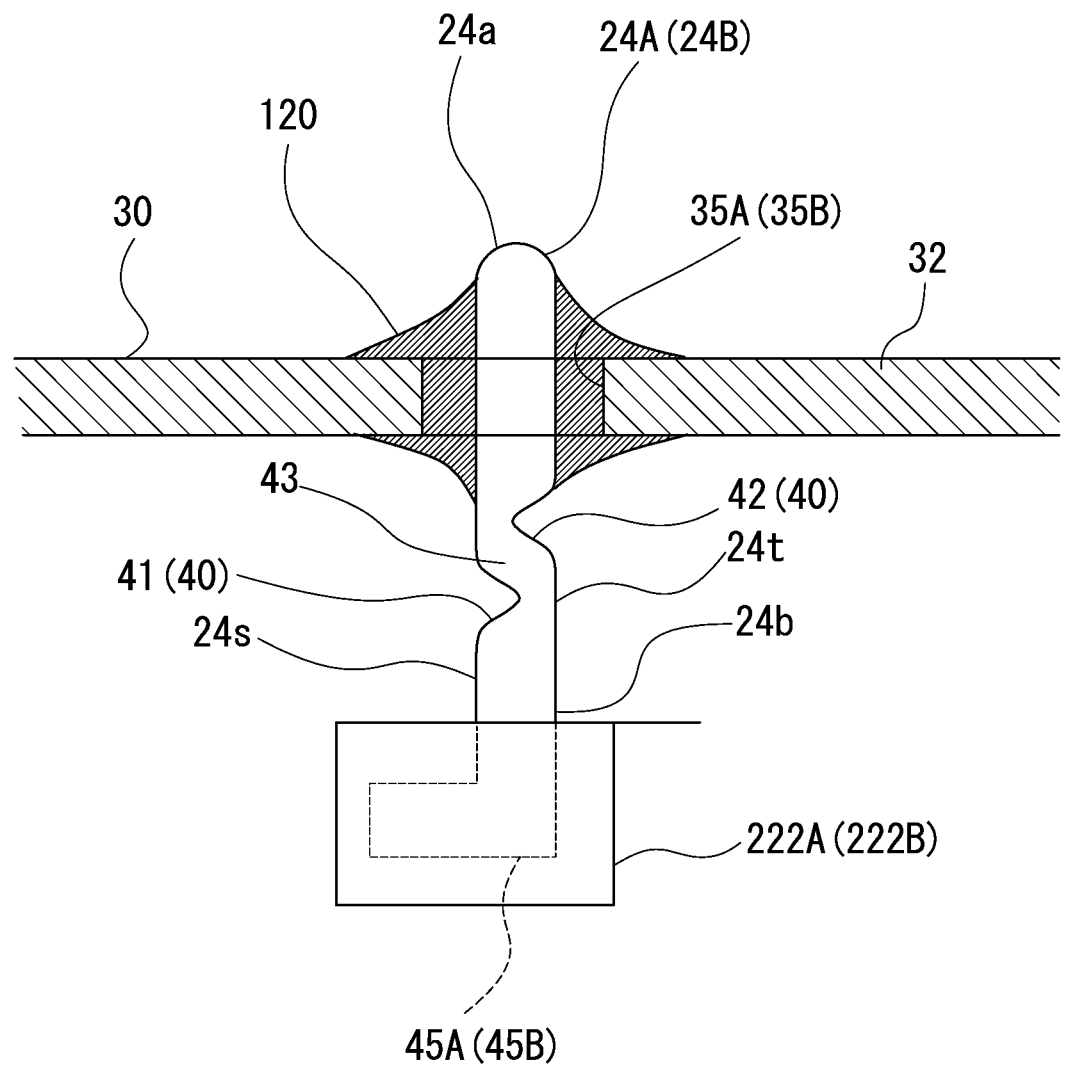
FIG. 6 is a sectional view showing a connection part between the board side terminal of the capacitor unit and the circuit board.

FIG. 1 is a schematic view showing a configuration of the electric compressor according to the embodiment of the present invention. FIG. 2 is a perspective view showing a circuit board and a capacitor unit provided in the electric compressor. FIG. 3 is a perspective view showing the capacitor unit. FIG. 4 is a plan view showing the capacitor unit provided in a casing of the electric compressor. FIG. 5 is a side sectional view showing the capacitor unit provided in the casing. FIG. 6 is a sectional view showing a connection part between the board side terminal of the capacitor unit and the circuit board.

As shown in FIG. 1, an electric compressor 10 of the present embodiment includes a casing 11, a motor 12, a compression mechanism 13, and a driving circuit portion 14. The electric compressor 10 configures a part of an air conditioner mounted on a vehicle, and compresses a refrigerant that circulates in the air conditioner.

The motor 12, the compression mechanism 13, and the driving circuit portion 14 are accommodated in the casing 11 which forms an outer shell of the electric compressor 10.

The motor 12 is rotationally driven by AC power output from the driving circuit portion 14. The motor 12 has a stator (not shown) and a rotor (not shown). The stator generates a magnetic field by the power supplied from a power source 15, such as a battery or a generator of the vehicle. The rotor rotates by a magnetic field generated by the stator.

The compression mechanism 13 is driven by the motor 12. The compression mechanism 13 is configured with, for example, a scroll compression mechanism. The compression mechanism 13 includes a fixed scroll (not shown) and a turning scroll (not shown). The compression mechanism 13 compresses a refrigerant (fluid) as the turning scroll is driven to turn with respect to the fixed scroll by rotation of the rotor (not shown) of the motor 12.

As shown in FIG. 2, the driving circuit portion 14 is accommodated inside an opening portion 11a of the casing 11. The driving circuit portion 14 includes a capacitor unit 20, the circuit board 30, and a plurality (two in the present embodiment) of power source harnesses 100.

The capacitor unit 20 removes and smooths a ripple component superimposed on the DC power supplied from the power source 15, and outputs the smoothed DC power to the circuit board 30.

The circuit board 30 converts the DC power output from the capacitor unit 20 into the AC power and outputs the AC power to the motor 12. The circuit board 30 includes a board main body 32, a switching element 33, and a PN terminal forming portion 34.

The board main body 32 is configured with a plate-like printed board. The board main body 32 has a predetermined wiring pattern made of a conductive material, such as copper. The board main body 32 is fixed to the casing 11 by a screw or the like (not shown).

The switching element 33 converts the DC power supplied from the power source 15 on the outside into three-phase AC power. The switching element 33 is configured with a plurality of insulated gate bipolar transistors (IGBT) or the like, and is mounted on the board main body 32. Leads 33b of each of the switching elements 33 are inserted into through-holes (not shown) formed in the board main body 32, and are soldered to the wiring pattern of the circuit board 30.

Each of the switching elements 33 switches between an ON state where a current flows and an OFF state where a current is blocked, based on a driving signal to be input from a control circuit mounted on the circuit board 30. In the present embodiment, the switching elements 33 are respectively provided two by two corresponding to each of a U phase, a V phase, and a W phase that form a three-phase alternating current. The plurality of switching elements 33 supply the three-phase (U phase, V phase, and W phase) AC power to the motor 12 by repeating ON and OFF at a predetermined timing regulated by the driving signal of the control circuit (not shown).

In addition, the switching element 33 is typically an IGBT, but may be a bipolar transistor, a metal-oxide-semiconductor field effect transistor (MOSFET), or the like.

Further, in addition to the switching element 33, the driving circuit portion 14 includes an appropriate electronic component mounted on the circuit board 30.

The PN terminal forming portion 34 is disposed in an end portion 30a adjacent to the capacitor unit 20 of the circuit board 30. The PN terminal forming portion 34 has a pair of a hole portion 35A and a hole portion 35B. The board side terminal 24 which is an output terminal of the capacitor unit 20 is respectively connected to the hole portion 35A and the hole portion 35B. By connecting the board side terminal 24 to the PN terminal forming portion 34, the DC power smoothed by the capacitor unit 20 is input to the circuit board 30.

As shown in FIGS. 3 and 4, the capacitor unit 20 includes a capacitor main body 21, a housing 22, a plurality (two in the present embodiment) of harness side terminals 23, a plurality (two in the present embodiment) of board side terminals 24, a plurality (four in the present embodiment) of guide portions 25, a first harness abutting portion 27, and a second harness abutting portion 28.

The capacitor main body 21 is an electric element that removes and smooths a ripple component superimposed on the DC power supplied from the power source 15.

The housing 22 is made of a resin made of an insulating material and has a hollow box shape. The housing 22 accommodates a capacitor main body 21 on the inside thereof. The housing 22 of the present embodiment includes a housing main body 221 and a block portion 222 that protrudes from the housing main body 221.

The housing main body 221 has a rectangular box shape. The housing main body 221 has an upper surface (first surface) 22t which is a surface on which the circuit board 30 is fixed. The housing main body 221 has a side surface 22f as a surface orthogonal to the upper surface 22t. In the present embodiment, on the upper surface 22t of the housing main body 221, the end portion on a side connected to the side surface 22f is referred to as a first end portion 22a. In the present embodiment, on the upper surface 22t, an end portion on a side opposite to the first end portion 22a is referred to as a second end portion 22b.

In addition, in the present embodiment, a direction orthogonal to the upper surface 22t is referred to as an upward-downward direction UD. In the upward-downward direction UD, a side that faces the upper surface 22t is referred to as an upper side in the upward-downward direction UD. In addition, a side opposite to the upper side in the upward-downward direction UD is referred to as a lower side in the upward-downward direction UD. Further, a direction orthogonal to the upward-downward direction UD and connecting the first end portion 22a and the second end portion 22b to each other is referred to as a forward-rearward direction (first direction) FR. In the forward-rearward direction FR, the first end portion 22a side which is a side that faces the side surface 22f is referred to as a front side in the forward-rearward direction FR. In addition, the second end portion 22b side opposite to the front side in the forward-rearward direction FR is referred to as a rear side in the forward-rearward direction FR. Further, a direction orthogonal to the upward-downward direction UD and the forward-rearward direction FR is referred to as a width direction W (second direction).

The block portion 222 protrudes from the side surface 22f of the housing 22 to the front side in the forward-rearward direction FR. The block portion 222 is integrally formed with the housing main body 221. The block portion 222 has an L shape in which the inside in the width direction W is recessed when viewed from the upward-downward direction UD. In the present embodiment, a first block portion 222A and a second block portion 222B are provided as the block portion 222.

The first block portion 222A protrudes from the same position in the width direction W as a first guide portion 25A with respect to the side surface 22f. In the first block portion 222A, the inside in the width direction W is recessed.

The second block portion 222B protrudes from the same position in the width direction W as a fourth guide portion 25D with respect to the side surface 22f. The second block portion 222B is recessed inward in the width direction W so as to face the first block portion 222A.

The harness side terminal 23 can be connected to the power source harness 100 for supplying the DC power from the outside to the capacitor main body 21. The harness side terminal 23 is made of a conductive metal. The harness side terminal 23 has an annular shape in which an opening 23h is formed in a center portion. The harness side terminal 23 is provided on the upper surface 22t of the housing main body 221. The harness side terminal 23 is provided on the upper surface 22t at a position closer to the first end portion 22a side than the center in the forward-rearward direction FR. The harness side terminals 23 are disposed at intervals in the width direction W.

The plurality of harness side terminals 23 in the present embodiment are a first harness side terminal 23A and a second harness side terminal 23B. The positions of the first harness side terminal 23A and the second harness side terminal 23B in the forward-rearward direction FR are the same, and are provided at an interval in the width direction W. One harness side terminal 23 is provided so as to be sandwiched in the width direction W by the pair of guide portions 25 which will be described later.

Specifically, a first power source harness 100A, which is one of the harness side terminals 23 for supplying the DC power from the power source 15 to the capacitor main body 21, is connected to the first harness side terminal 23A in the present embodiment. Similarly, a second power source harness 100B, which is the power source harness 100 different from the first harness side terminal 23A for supplying the DC power from the power source 15 to the capacitor main body 21, is connected to the second harness side terminal 23B.

As shown in FIG. 5, the housing 22 includes screw holes 22h that extend downward from the upper surface 22t of the housing 22 respectively at positions continuous with the openings 23h of the plurality of harness side terminals 23.

As shown in FIGS. 3 to 5, the plurality of guide portions 25 protrude from the upper surface 22t. The guide portion 25 extends from the second end portion 22b in the forward-rearward direction FR on the upper surface 22t toward the first end portion 22a. The guide portion 25 protrudes in a rectangular plate shape. The guide portion 25 of the present embodiment is integrally formed with the housing main body 221 as a part of the housing 22. The guide portions 25 are provided in pairs on the upper surface 22t so as to be separated from each other in the width direction W. In the present embodiment, as the plurality of guide portions 25, the first guide portion 25A and a second guide portion 25B that correspond to the first harness side terminal 23A, and a third guide portion 25C and a fourth guide portion 25D that correspond to the second harness side terminal 23B are respectively formed.

The first guide portion 25A and the second guide portion 25B are disposed at an interval from each other so as to sandwich the first harness side terminal 23A in the width direction W. The third guide portion 25C and the fourth guide portion 25D are disposed at an interval from each other so as to sandwich the second harness side terminal 23B in the width direction W.

The first harness abutting portion 27 can abut against the power source harness 100 from the inside in the width direction W on the upper surface 22t. The first harness abutting portion 27 protrudes from the second end portion 22b side more than the center in the forward-rearward direction FR on the upper surface 22t. The first harness abutting portion 27 of the present embodiment is integrally formed with the housing main body 221 as a part of the housing 22. The first harness abutting portion 27 protrudes in the upward-downward direction UD orthogonal to the upper surface 22t in the center portion in the width direction W in the second end portion 22b of the upper surface 22t. The first harness abutting portion 27 protrudes in the center portion in the width direction W in a rectangular cylinder shape having rounded corner portions. The first harness abutting portion 27 is formed continuously with the second guide portion 25B and the third guide portion 25C.

The second harness abutting portion 28 can abut against the power source harness 100 from the lower side in the upward-downward direction UD on the upper surface 22t. The second harness abutting portion 28 is provided to be adjacent to both sides of the first harness abutting portion 27 in the width direction W in the second end portion 22b of the housing main body 221. The second harness abutting portion 28 of the present embodiment is integrally formed with the housing main body 221 as a part of the housing 22. The second harness abutting portion 28 has a top surface 28t that protrudes to the upper side in the upward-downward direction UD from the upper surface 22t of the housing 22. The second harness abutting portion 28 has a smaller protrusion dimension from the upper surface 22t of the housing 22 than the first harness abutting portion 27.

In addition, the guide portion 25, the first harness abutting portion 27, and the second harness abutting portion 28 are not limited to a case of being integrally formed with the housing 22. For example, the guide portion 25, the first harness abutting portion 27, and the second harness abutting portion 28 may be formed by fixing a different member to the housing 22.

The board side terminal 24 is provided on the side surface 22f of the first end portion 22a of the housing 22. The board side terminal 24 can be connected to the circuit board 30 so as to output the DC power via the capacitor main body 21. The board side terminal 24 of the present embodiment is formed by a plate-like metal plate made of a conductive metal. The board side terminal 24 extends in a plate shape from the base portion 24b held by the housing main body 221 toward the distal end portion 24a connected to the circuit board 30. Specifically, the board side terminal 24 extends in a plate shape from the block portion 222 toward the upper side in the upward-downward direction UD. The board side terminal 24 extends parallel to the side surface 22f from the block portion 222 toward the upper surface 22t side. The board side terminal 24 is provided such that a thickness direction thereof matches the forward-rearward direction FR orthogonal to the side surface 22f. The board side terminal 24 is formed with a notch portion 40 which is recessed inward in the width direction W between the base portion 24b and the distal end portion 24a.

As shown in FIGS. 3 and 6, the distal end portion 24a is a region connected to the circuit board 30, and is a region above the center in the upward-downward direction UD in the board side terminal 24. The base portion 24b is a region held by the housing 22 and is a region below the center in the upward-downward direction UD in the board side terminal 24.

In the present embodiment, a plurality of notch portions 40 are formed for one board side terminal 24. Specifically, in the board side terminal 24 of the present embodiment, a first notch portion 41 and a second notch portion 42 are formed as the plurality of notch portions 40. The first notch portion 41 is formed in the board side terminal 24 so as to be recessed inward (second side) in the width direction W from an outer edge portion 24s on the outside (first side) of the board side terminal 24 in the width direction W. The second notch portion 42 is formed in the board side terminal 24 so as to be recessed outward in the width direction W from an inner edge portion 24t on the inside of the board side terminal 24 in the width direction W. The first notch portion 41 and the second notch portion 42 are formed at an interval in the upward-downward direction UD which is a direction of connecting the base portion 24b and the distal end portion 24a to each other. The first notch portion 41 is formed above the second notch portion 42 in the upward-downward direction UD such that the positions of the second notch portion 42 in the upward-downward direction UD do not overlap each other.

In the board side terminal 24, a curved portion 43 is formed by the first notch portion 41 and the second notch portion 42. The curved portion 43 has a partially smaller sectional area orthogonal to the upward-downward direction UD in which the board side terminal 24 extends than the distal end portion 24a and the base portion 24b. The curved portion 43 extends in a direction inclined with respect to the upward-downward direction UD.

The plurality of board side terminals 24 in the present embodiment are a first board side terminal 24A and a second board side terminal 24B. The positions of the first board side terminal 24A and the second board side terminal 24B in the forward-rearward direction FR are the same, and are provided at an interval in the width direction W.

The first harness side terminal 23A and the first board side terminal 24A are formed in both end portions of an integrally formed first bus bar 45A. In addition, the second harness side terminal 23B and the second board side terminal 24B are formed in both end portions of an integrally formed second bus bar 45B. The first bus bar 45A and the second bus bar 45B are formed by cutting a plate made of a conductive metal into a predetermined shape by pressing or the like, and bending the plate at a plurality of locations in a longitudinal direction. The first bus bar 45A and the second bus bar 45B are buried in the housing 22 so as to expose only the first harness side terminal 23A and the second harness side terminal 23B of both end portions and the first board side terminal 24A and the second board side terminal 24B from the housing 22.

As shown in FIG. 2, the capacitor unit 20 as described above is disposed at a position along the end portion 30a of the circuit board 30. The capacitor unit 20 is fixed to the casing 11 by a screw (not shown) or the like. The capacitor unit 20 is connected to the circuit board 30 via the first board side terminal 24A and the second board side terminal 24B. As shown in FIGS. 2 and 6, the first board side terminal 24A and the second board side terminal 24B are inserted into the hole portion 35A and the hole portion 35B of the board main body 32. The first board side terminal 24A and the second board side terminal 24B are soldered to land portions of the wiring pattern formed around the hole portion 35A and the hole portion 35B by a solder 120 (refer to FIG. 6).

As shown in FIGS. 2, 4, and 5, the capacitor unit 20 is connected to the power source 15, such as a battery or a generator of a vehicle via the plurality of power source harnesses 100. The plurality of power source harnesses 100 respectively include a harness main body 101 and a terminal 102. The harness main body 101 is a flexible linear member. The harness main body 101 has a wire (not shown) made of a conductive metal and an insulating coating 101a that covers the wire. The terminal 102 is made of a conductive metal and has an annular shape. The terminal 102 is fixed to the distal end (one end portion) of the harness main body 101.

In the power source harness 100, a proximal end (not shown) (the other end portion opposite to the distal end) is connected to a positive electrode or a negative electrode of the power source 15, such as a battery or a generator. The terminals 102 respectively provided at the distal end of the power source harness 100 are connected to the harness side terminal 23 by fastening the bolt 110 to the screw hole 22h in a state of being superimposed on the harness side terminal 23.

By being connected to the harness side terminal 23 in the first end portion 22a of the housing 22, the harness main body 101 is disposed to extend from the first end portion 22a to the second end portion 22b side along the upper surface 22t of the housing 22. The power source harness 100 extends while being curved downward from the second end portion 22b of the housing 22 toward the casing 11 positioned on the outside, and is inserted through a harness insertion hole 17 formed below the capacitor unit 20. Here, as shown in FIG. 4, the harness insertion hole 17 is formed offset to one side in the width direction W, that is, the first harness side terminal 23A side in the present embodiment, in the capacitor unit 20.

The plurality of power source harnesses 100 in the present embodiment are a first power source harness 100A and a second power source harness 100B. The terminal 102 of the first power source harness 100A is connected to the first harness side terminal 23A. The terminal 102 of the second power source harness 100B is connected to the second harness side terminal 23B. The first power source harness 100A is disposed along the harness main body 101 between the first guide portion 25A and the second guide portion 25B. The second power source harness 100B is disposed along the harness main body 101 between the third guide portion 25C and the fourth guide portion 25D.

As shown in FIGS. 4 and 5, the first power source harness 100A disposed as described above abuts against at least one of the first harness abutting portion 27 and the second harness abutting portion 28 in the second end portion 22b of the housing 22. Similarly, the second power source harness 100B abuts against at least one of the first harness abutting portion 27 and the second harness abutting portion 28 in the second end portion 22b of the housing 22.

Furthermore, in the first power source harness 100A and the second power source harness 100B, the outer side in a curve direction of the harness main body 101 comes into contact with the inner peripheral surface (casing side harness abutting portion) 17f of the harness insertion hole 17.

In this manner, the first power source harness 100A comes into contact with at least three locations of the first harness side terminal 23A, the first harness abutting portion 27, and the inner peripheral surface 17f of the harness insertion hole 17. In addition, the second power source harness 100B comes into contact with at least three locations of the second harness side terminal 23B, at least one of the first harness abutting portion 27 and the second harness abutting portion 28, and the inner peripheral surface 17f of the harness insertion hole 17.

According to the capacitor unit 20 and the electric compressor 10 as described above, the first guide portion 25A and the second guide portion 25B are formed so as to sandwich the first harness side terminal 23A. The terminal 102 of the first power source harness 100A is fixed to the first harness side terminal 23A in the first harness side terminal 23A. Accordingly, the harness main body 101 of the first power source harness 100A is disposed to extend from the first end portion 22a toward the second end portion 22b on the upper surface 22t in a state of being sandwiched from the width direction W by the first guide portion 25A and the second guide portion 25B. Similarly, the terminal 102 of the second power source harness 100B is fixed to the second harness side terminal 23B. Accordingly, the harness main body 101 of the second power source harness 100B is disposed to extend from the first end portion 22a toward the second end portion 22b on the upper surface 22t along the third guide portion 25C and the fourth guide portion 25D. Therefore, the movement of the harness main body 101 of the first power source harness 100A and the second power source harness 100B in the width direction W is restricted by the guide portion 25. Therefore, excessive vibration of the first power source harness 100A and the second power source harness 100B can be suppressed. Accordingly, it becomes possible to suppress the vibration of the power source harness 100 to be connected to the capacitor unit 20.

Furthermore, the first harness side terminal 23A is sandwiched by the first guide portion 25A and the second guide portion 25B, and the second harness side terminal 23B is separately sandwiched by the third guide portion 25C and the fourth guide portion 25D. Therefore, the guide portions 25 are disposed on both sides in the width direction W of each of the first power source harness 100A fixed to the first harness side terminal 23A and the second power source harness 100B fixed to the second harness side terminal 23B. Accordingly, it is possible to ensure the insulation distance around each of the first power source harness 100A and the second power source harness 100B.

In addition, the first power source harness 100A and the second power source harness 100B come into contact with the first harness abutting portion 27 in the width direction W in the second end portion 22b. Therefore, the movement of the first power source harness 100A and the second power source harness 100B in the width direction W is restricted not only on the first end portion 22a side fixed to the harness side terminal 23 but also on the second end portion 22b side. Accordingly, the vibration of the first power source harness 100A and the second power source harness 100B in the width direction W can be effectively suppressed.

Furthermore, the first power source harness 100A and the second power source harness 100B come into contact with the inner peripheral surface 17f of the harness insertion hole 17 formed in the casing 11 from the upper side in the upward-downward direction UD at a part derived from the capacitor unit 20. Additionally, the first power source harness 100A and the second power source harness 100B come into contact with the second harness abutting portion 28 from the lower side the upward-downward direction UD. Accordingly, the first power source harness 100A and the second power source harness 100B are supported to be sandwiched from the upward-downward direction UD at three points of the first harness side terminal 23A and the second harness side terminal 23B, the second harness abutting portion 28, and the inner peripheral surface 17f of the harness insertion hole 17. As a result, the movement of the first harness side terminal 23A and the second harness side terminal 23B in the upward-downward direction UD is restricted. Accordingly, the vibration of the first power source harness 100A and the second power source harness 100B in the upward-downward direction UD can be effectively suppressed.

In addition, the harness side terminal 23 and the board side terminal 24 are provided on the same side of the housing 22 (the first end portion 22a side). Therefore, the connection work between the board side terminal 24 and the circuit board 30 and the connection work between the harness side terminal 23 and the power source harness 100 can be efficiently performed.

In addition, the curved portion 43 having a shorter length and a smaller sectional area in the width direction W than the distal end portions 24a or the base portions 24b is partially formed in the board side terminal 24 by the notch portion 40. Here, when the capacitor unit 20 and the circuit board 30 are relatively displaced due to the vibration input from the outside, the curved portion 43 having a smaller sectional area than the distal end portion 24a and the base portion 24b in the board side terminal 24 is elastically deformed in the width direction W. Therefore, the vibration of the distal end portion 24a in the width direction W with respect to the base portion 24b is absorbed by the curved portion 43. As a result, it is possible to further suppress stress concentration in the distal end portion 24a connected to the circuit board 30 by the solder. Therefore, the vibration transmitted from the circuit board 30 to the board side terminal 24 can be absorbed by the curved portion 43, and the deformation or damage to the solder (connection part) between the board side terminal 24 and the distal end portion 24a can be suppressed.

Further, a first notch portion 41 and a second notch portion 42 which are recessed in different directions in the width direction W are formed. Therefore, the movement of the distal end portion 24a in any direction in the width direction W is also absorbed by the curved portion 43. As a result, it is possible to further suppress stress concentration in the board side terminal 24 connected to the circuit board 30 by the solder. Accordingly, it is possible to effectively suppress the deformation or damage to the solder (connection part) between the board side terminal 24 and the distal end portion 24a.

In addition, the first notch portion 41 and the second notch portion 42 are formed at an interval in the upward-downward direction UD. Therefore, the curved portion 43 can be formed on the board side terminal 24 so as to be curved in an S shape between the distal end portion 24a and the base portion 24b. Such a shape can be formed at the same time even when the board side terminal 24 is thin. Specifically, when forming the first bus bar 45A and the second bus bar 45B, the first bus bar 45A and the second bus bar 45B are easily formed at the same time by cutting a plate made of a conductive metal into a predetermined shape by pressing or the like. Therefore, it is not necessary to increase the number of processing steps in order to form the curved portion 43, and it is possible to form the first notch portion 41 and the second notch portion 42 which are efficiently recessed in different directions.

Above, although the embodiments of the present invention have been described in detail with reference to the drawings, the respective configurations and combinations thereof in the respective embodiments are merely examples, and additions, omissions, substitutions, and other changes of configurations are possible within the scope that does not depart from the gist of the present invention. In addition, the present invention is not limited by the embodiments, but is limited only by the claims.

For example, the first guide portion 25A and the second guide portion 25B are provided on both sides of the first harness side terminal 23A, and the third guide portion 25C and the fourth guide portion 25D are provided on both sides of the second harness side terminal 23B, but the present invention is not limited thereto. The guide portions 25 may be provided at least on only both outer sides of the upper surface 22t in the width direction W similar to the first guide portion 25A and the fourth guide portion 25D.

In addition, although the curved portion 43 is configured by forming the notch portion 40 in the board side terminal 24, the number, arrangement, shape, and the like of the notch portion 40 can be appropriately changed.

In addition, the configuration of each part of the electric compressor 10 can be appropriately changed. Furthermore, although the air conditioner for vehicles provided with the electric compressor 10 was shown as an example, the present invention is not limited thereto, and the same configuration can also be applied to a refrigeration system provided with the electric compressor 10.

INDUSTRIAL APPLICABILITY

According to the capacitor unit and the electric compressor, it becomes possible to suppress the vibration of the power source harness to be connected to the capacitor unit.

REFERENCE SIGNS LIST

10 Electric compressor
11 Casing
11a Opening portion
12 motor
13 Compression mechanism
14 Driving circuit portion
15 Power source
17 Harness insertion hole
17f Inner peripheral surface (casing side harness abutting portion)
20 Capacitor unit
21 Capacitor main body
22 Housing
221 Housing main body
222 Block portion
222A First block portion
222B Second block portion
22a First end portion
22b Second end portion
22f Side surface
22h Screw hole
22t Upper surface (first surface)
23 Harness side terminal
23A First harness side terminal
23B Second harness side terminal
23h Opening
24 Board side terminal
24A First board side terminal
24B Second board side terminal
24a Distal end portion
24b Base portion
24s Outer edge portion
24t Inner edge portion
25 Guide portion
25A First guide portion
25B Second guide portion
25C Third guide portion
25D Fourth guide portion
27 First harness abutting portion
28 Second harness abutting portion
28t Top surface
30 Circuit board
30a End portion
32 Board main body
33 Switching element
34 PN terminal forming portion
35 Electronic component
35A, 35B Hole portion
40 Notch portion
41 First notch portion
42 Second notch portion
43 Curved portion
45A First bus bar
45B Second bus bar
100 Power source harness
100A First power source harness
100B Second power source harness
101 Harness main body
101a Insulating coating
102 Terminal
110 Bolt
120 Solder
FR Forward-rearward direction (first direction)
W Width direction (Second direction)
UD Upward-downward direction

What is claimed is:

1. A capacitor unit comprising:
a housing that accommodates a capacitor main body therein;
a harness side terminal provided on a first end portion side of a first surface of the housing and connectable to a power source harness for supplying DC power from an outside;
a board side terminal provided in the housing and connectable to a circuit board from which the DC power is output via the capacitor main body; and
a plurality of guide portions that protrude from the first surface and extend from a second end portion on a side opposite to the first end portion on the first surface toward the first end portion, and
harness abutting portions that protrudes on the second end portion side of the first surface and that are configured to abut against the power source harness,
wherein the plurality of guide portions are disposed to be separated in a second direction orthogonal to a first direction of connecting the first end portion and the second end portion to each other so as to sandwich the harness side terminal therebetween; and
wherein the harness abutting portions include
a first harness abutting portion which is disposed at a position closer to the second end portion than a central of the first surface in the first direction and protrudes in an upward-downward direction orthogonal to the first surface in the second end portion of the first surface; and
a second harness abutting portion which protrudes from the second end portion adjacent to a side of the first harness abutting portion in the second end portion so as to be able to abut against the power source harness from a lower side in the upward-downward direction,
wherein the second harness abutting portion has a smaller protrusion dimension from the first surface of housing than the first harness abutting portion.

2. The capacitor unit according to claim 1,
wherein the plurality of guide portions are provided in a pair so as to sandwich therebetween one of the harness side terminals in the second direction.

3. The capacitor unit according to claim 1,
wherein the board side terminal is provided in the first end portion of the housing.

4. The capacitor unit according to claim 1,
wherein the board side terminal
extends in a plate shape from a base portion held in the housing toward a distal end portion connected to the circuit board, and
has a notch portion recessed inward of the board side terminal in a width direction between the base portion and the distal end portion.

5. The capacitor unit according to claim 4,
wherein a first notch portion formed on a first side of the board side terminal in the width direction and a second notch portion formed on a second side of the board side terminal in the width direction, are formed.

6. The capacitor unit according to claim 5,
wherein the first notch portion and the second notch portion are formed at an interval in a direction of connecting the base portion and the distal end portion to each other.

7. An electric compressor comprising:

the capacitor unit according to claim 1;

a power source harness of which one end portion is connected to the harness side terminal and which extends toward the second end portion side;

the circuit board that is configured to convert the DC power output from the capacitor unit into AC power;

a motor rotationally driven by the AC power output from the circuit board;

a compression mechanism driven by the motor; and a casing that accommodates the capacitor unit, the circuit board, the motor, and the compression mechanism.

8. The electric compressor according to claim 7,
wherein the casing includes a casing side harness abutting portion which abuts against the power source harness derived from the second end portion side of the housing.

* * * * *